(12) United States Patent
Kato et al.

(10) Patent No.: US 9,316,167 B2
(45) Date of Patent: Apr. 19, 2016

(54) VEHICLE EQUIPPED WITH A HYDRAULICALLY-OPERATED DEVICE

(71) Applicant: KABUSHIKI KAISHA TOYOTA JIDOSHOKKI, Kariya-shi, Aichi-ken (JP)

(72) Inventors: Norihiko Kato, Aichi-ken (JP); Yukikazu Koide, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/665,241

(22) Filed: Mar. 23, 2015

(65) Prior Publication Data

US 2015/0275798 A1  Oct. 1, 2015

(30) Foreign Application Priority Data

Mar. 26, 2014 (JP) ................................ 2014-064795

(51) Int. Cl.
*B60W 20/00* (2006.01)
*F02D 29/02* (2006.01)
*F02D 41/06* (2006.01)
*B66F 9/075* (2006.01)
*F02D 29/04* (2006.01)
(Continued)

(52) U.S. Cl.
CPC ............. *F02D 41/068* (2013.01); *B60W 10/06* (2013.01); *B60W 30/194* (2013.01); *B66F 9/06* (2013.01); *B66F 9/07572* (2013.01); *F02D 29/02* (2013.01); *F02D 29/04* (2013.01); *B60W 2300/121* (2013.01); *B60W 2510/0676* (2013.01); *B60W 2710/0666* (2013.01); *B60W 2710/0672* (2013.01); *F02D 2001/0075* (2013.01); *F02D 2001/167* (2013.01); *F02D 2250/26* (2013.01)

(58) Field of Classification Search
CPC ....... B60W 20/00; B60W 10/08; F02D 29/02; B66F 9/04
USPC .................................. 701/50, 22; 180/65.265
See application file for complete search history.

(56) References Cited

U.S. PATENT DOCUMENTS

| 2007/0239339 A1* | 10/2007 | Martin | ...................... B60K 6/48 701/54 |
| 2011/0320095 A1* | 12/2011 | Anderson | ............. B60W 10/06 701/54 |

FOREIGN PATENT DOCUMENTS

| EP | 1267075 A2 | 12/2002 |
| JP | 2008-105532 A | 5/2008 |

(Continued)

OTHER PUBLICATIONS

Communication dated Sep. 10, 2015, issued by the European Patent Office in corresponding European Application No. 15160018.6.

*Primary Examiner* — Tan Q Nguyen
(74) *Attorney, Agent, or Firm* — Sughrue Mion, PLLC

(57) ABSTRACT

A vehicle equipped with a hydraulically-operated device includes an engine that drives the hydraulically-operated device, a temperature detection unit that detects a temperature of the engine or hydraulic oil and a control unit that controls the engine. The control unit is allowed to control torque of the engine in accordance with a predetermined specified torque limit value when the control unit is in an Eco-mode, and does not control the torque of the engine in accordance with the specified torque limit value in the Eco-mode when the temperature detected by the temperature detection unit is a predetermined specified release temperature or lower. The release temperature is set as a temperature at which output of the engine is hard to be stabilized.

5 Claims, 2 Drawing Sheets

(51) Int. Cl.
  *B60W 10/06* (2006.01)
  *B60W 30/194* (2012.01)
  *B66F 9/06* (2006.01)
  B66F 9/04 (2006.01)
  F02D 1/16 (2006.01)
  F02D 1/00 (2006.01)

(56) References Cited

FOREIGN PATENT DOCUMENTS

| | | |
|---|---|---|
| JP | 2009127548 A | 6/2009 |
| WO | 2011115290 A1 | 9/2011 |

\* cited by examiner

| COMPARISON RESULT | SELECTED CONTROL |
|---|---|
| ΔX ≤ ΔY | 1ST CONTROL (TEMPERATURE) |
| ΔX > ΔY | 2ND CONTROL (TIME) |

VEHICLE EQUIPPED WITH A HYDRAULICALLY-OPERATED DEVICE

BACKGROUND OF THE INVENTION

The present invention relates to a vehicle equipped with a hydraulically-operated device.

In view of the demand for the fuel economy, there has been proposed a hybrid vehicle in which an economy mode (Eco-mode) is selectable. The Eco-mode may be turned ON or activated by pressing an Eco-mode switch. When the Eco-mode is thus selected, the engine output torque is changed from the torque that is required during normal operation of the vehicle to the torque that is controlled for energy saving so that the engine of the vehicle is operated with efficiency. Such vehicle is disclosed, for example, by Japanese Unexamined Patent Application Publication No. 2008-105532.

In the hybrid vehicle disclosed in the above-cited Publication, the improvement of the fuel economy and the simultaneous maintenance of the required vehicle performance (the required torque) are accomplished by operating the engine efficiently and supplementing the engine with torque using a motor in the Eco-mode. Unlike such hybrid vehicle, however, in the vehicle that is powered by an engine and has no motor, no torque can be supplemented to the engine.

Therefore, in a forklift truck powered by an engine that is equipped with a hydraulically-operated device, there is a fear that an engine stall may occur in the Eco-mode due to insufficient engine torque attributable to a rapid increase of the load occurring during the loading operation. Particularly, immediately after a start of the engine, for example, the engine is not sufficiently warmed up and the engine output is yet to be stabilized. Furthermore, the hydraulic oil for hydraulically-operated device is low in temperature and high in viscosity. Such factors increase the load on the forklift truck and an engine stall may be caused easily.

The present invention, which has been made in view of such problems underlying the background art, is directed to providing a vehicle equipped with a hydraulically-operated device that prevents the occurrence of an engine stall successfully.

SUMMARY OF THE INVENTION

In accordance with the present invention, there is provided a vehicle equipped with a hydraulically-operated device that solves the above-identified problems. The vehicle includes an engine that drives the hydraulically-operated device, a temperature detection unit that detects a temperature of the engine or a temperature of hydraulic oil, and a control unit that controls the engine. The control unit is allowed to control torque of the engine in accordance with a predetermined specified torque limit value when the control unit is in an Eco-mode. The engine control unit controls the engine without controlling the torque of the engine in accordance with the specified torque limit value in the Eco-mode when the temperature detected by the temperature detection unit is at a predetermined release temperature or lower. The release temperature is set as a temperature at which output of the engine is hard to be stabilized.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the embodiments together with the accompanying drawings in which:

DETAILED DESCRIPTION OF THE PREFERRED EMBODIMENTS

Figure 1:
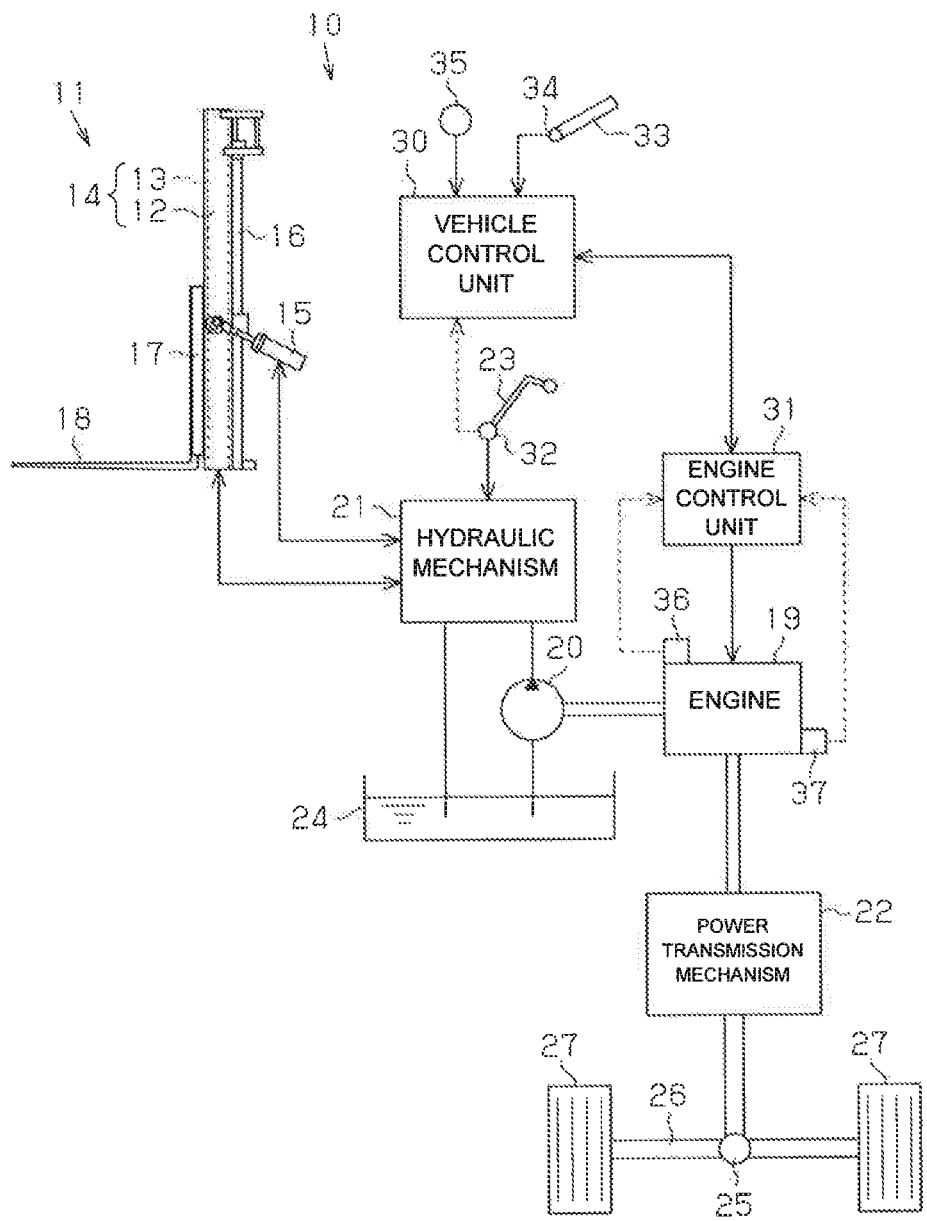
FIG. 1 is a schematic view illustrating an entire configuration of a forklift truck according to an embodiment of the present invention.
Figures 2, 3:
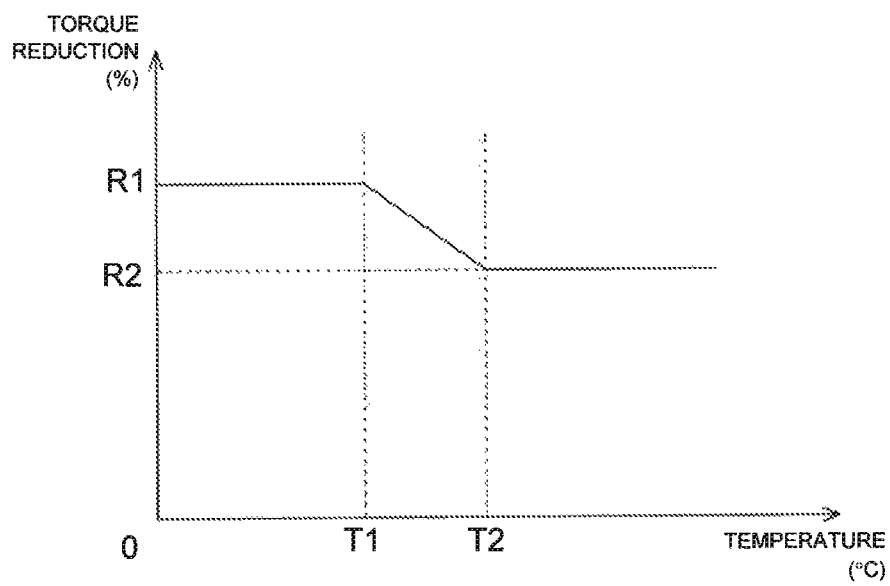
FIG. 2 is a graph explaining a relationship between the torque control and the temperature of coolant.
FIG. 3 is a table explaining conditions for performing the torque control.

The following will describe an embodiment of a vehicle equipped with a hydraulically-operated device according to the present invention with reference to FIGS. 1 to 3.

Referring to FIG. 1, there is schematically shown a forklift truck that is designated generally by 10. The forklift truck 10 as a vehicle of the present invention includes vehicle body (not shown) having mounted thereon a loading unit 11. The loading unit 11 has a multi-stage mast assembly 14 including a pair of right and left outer masts 12 and a pair of right and left inner masts 13. Each outer mast 12 is connected to a hydraulic tilt cylinder 15. Each inner mast 13 is connected to a hydraulic lift cylinder 16. The mast assembly 14 is tiltable in the forward and rearward directions of the forklift truck 10 according to the flow of hydraulic oil to and from the tilt cylinders 15. The inner masts 13 are movable upward and downward in the vertical direction of the forklift truck 10 according to the flow of hydraulic oil to and from the lift cylinders 16. Forks 18 are mounted to the inner masts 13 via lift brackets 17. The inner masts 13 are movable up and down along the outer masts 12 by the operation of the lift cylinders 16, which moves the forks 18 up and down together with the lift brackets 17.

The forklift truck 10 includes an engine 19 as a drive source for the traveling operation and the loading operation of the forklift truck 10, a hydraulic pump 20 that is driven by the engine 19 to deliver hydraulic oil under pressure, a hydraulic mechanism 21 to which the hydraulic oil is supplied from the hydraulic pump 20, and a power transmission mechanism 22 that transmits output power of the engine 19.

The hydraulic mechanism 21 has a control valve through which the flow of the hydraulic oil to and from the tilt cylinders 15 and the lift cylinders 16 is controlled. A loading operation member 23 which is manipulated by an operator of the forklift truck 10 for instructing operation of the tilt cylinders 15 and the lift cylinders 16 is mechanically connected to the control valve of the hydraulic mechanism 21. The control valve of the hydraulic mechanism 21 is opened or closed according to the operation of the loading operation member 23. An oil tank 24 is connected to the hydraulic mechanism 21 directly and through the hydraulic pump 20. The hydraulic oil in the oil tank 24 is pumped by the hydraulic pump 20 and supplied to the tilt cylinders 15 and the lift cylinders 16 through the hydraulic mechanism 21. The hydraulic oil flowed out from the tilt cylinders 15 and the lift cylinders 16 is returned to the oil tank 24 through the hydraulic mechanism 21. Thus, the forklift truck 10 is a vehicle (an industrial vehicle) which is equipped with the tilt cylinders 15 and the lift cylinders 16 as the hydraulically-operated devices that are driven by the engine 19.

The power transmission mechanism 22 has devices for transmitting power such as a torque converter and a transmission. An axle 26 is connected to the engine 19 through the power transmission mechanism 22 and a differential gear 25. Two drive wheels 27 are mounted on the opposite ends of the axle 26. The output power of the engine 19 is transmitted to the drive wheels 27 through the power transmission mechanism 22, the differential gear 25, and the axle 26.

The forklift truck 10 further includes a vehicle control unit 30 and an engine control unit 31. The engine control unit 31 is electrically connected to the vehicle control unit 30. The vehicle control unit 30 is electrically connected with a detection sensor 32 that detects the operational state of the loading operation member 23 and an acceleration sensor 34 that detects an opening of the accelerator pedal 33 that controls the acceleration of the forklift truck 10. The accelerator pedal 33 corresponds to the accelerator operation member of the present invention. An Eco-mode switch 35 is provided at a position adjacent to the driver's seat in the forklift truck 10. The Eco-mode switch 35 is connected to the vehicle control unit 30. The vehicle control unit 30 detects the operational position of the Eco-mode switch 35. In the present embodiment, the operational state of the forklift truck 10 can be changed by selecting the desired position (ON or OFF) of the Eco-mode switch 35 by the operator of the forklift truck 10.

An engine speed sensor 36 that detects a speed of the engine 19 in terms of rpm and a temperature sensor 37 as a temperature detection unit that detects a temperature of coolant as a temperature of the engine 19 are connected to the engine control unit 31. The engine control unit 31 generates to the vehicle control unit 30 a signal that is indicative of an engine speed detected by the engine speed sensor 36 and a signal indicative of a temperature detected by the temperature sensor 37.

The vehicle control unit 30 generates to the engine control unit 31 an instruction that is indicative of an engine speed for controlling the operation of the engine 19 so that the engine 19 is driven at a speed that corresponds to the detected depression amount of the accelerator pedal 33 (or the opening of the accelerator pedal 33). When the Eco-mode switch 35 is turned ON and the Eco-mode is activated, the vehicle control unit 30 generates to the engine control unit 31 an instruction that is indicative of a torque control. The engine control unit 31 controls the speed of the engine 19 based on the engine speed instruction from the vehicle control unit 30. The engine control unit 31 then controls the torque of the engine 19 in the Eco-mode. In the present embodiment, the vehicle control unit 30 and the engine control unit 31 cooperate to constitute a control unit that controls the engine 19. It is to be noted that in the forklift truck 10 in which the hydraulic pump 20 is driven by the engine 19, the tilt cylinders 15 and the lift cylinders 16 are operable by operating the loading operation member 23 while depressing the accelerator pedal 33.

The operation of the forklift truck 10 will now be described.

The vehicle control unit 30 changes the torque limit value to be issued to the engine control unit 31 according to the operational position of the Eco-mode switch 35. The forklift truck 10 is in the normal mode of operation when the Eco-mode switch 35 is placed in OFF position where the Eco-mode is deactivated and in the Eco-mode of operation when the Eco-mode switch 35 is placed in ON position where the Eco-mode is activated, respectively. In the normal mode, a torque of R1% (e.g. 100%) is generated according to an opening of the accelerator pedal 33. In the Eco-mode, on the other hand, the torque of the engine 19 is controlled so that the output torque of the engine 19 is reduced to R2% (e.g. about 80%), which is lower than the torque in the normal mode, to thereby reduce fuel consumption of the engine 19. It is to be noted that an optimum value is previously determined, taking the maximum load capacity of the forklift truck 10, the specifications of the engine 19 to be mounted on the forklift truck 10 and the nature of the tasks to be handled by the forklift truck 10, etc. into account. In the present embodiment, the torque limit value in the normal mode is the specified torque limit value.

The vehicle control unit 30 receives a signal that is indicative of a temperature detected by the temperature sensor 37 through the engine control unit 31. When the Eco-mode switch 35 is ON, the vehicle control unit 30 controlling the engine 19 may or may not control the torque of the engine depending on the temperature detected by the temperature sensor 37. More specifically, the vehicle control unit 30 controls the torque of the engine 19 while controlling the engine 19 in the Eco-mode when the temperature detected by the temperature sensor 37 is higher than a temperature T1. When the temperature detected by the temperature sensor 37 is T1 or lower, on the other hand, the vehicle control unit 30 controls the engine 19 without controlling the torque of the engine 19 even in the Eco-mode.

The temperature of the engine 19 decreases with the elapse of time after the engine 19 is stopped (or the engine 19 being turned OFF). Furthermore, the temperature of the engine 19 at a start thereof (or the engine 19 being turned ON) is low and a stabilized engine output is not produced while the engine 19 is yet to be warmed up. Therefore, in the forklift truck 10 in which the engine 19 drives the hydraulic pump 20, loading operation while the engine 19 running under a low temperature may cause the engine 19 to stall because of the increased load of the hydraulic pump 20 on the engine 19.

In view of the circumstances above, the vehicle control unit 30 of the forklift truck 10 according to the present embodiment does not control the torque in the Eco-mode when the engine output of the engine 19 is yet to be stabilized. Whether or not the vehicle control unit 30 should control the torque is determined depending on the availability of the stabilized engine output from the engine 19. In the present embodiment, the state of the engine 19 is determined based on the temperature of the coolant of the engine 19. Like the temperature of the engine 19, the temperature of the coolant decreases with the elapse of time after the engine 19 is turned OFF. On the other hand, the temperature of the coolant increases with an increase of the temperature of the engine 19 because the coolant exchanges heat with the engine 19. Thus, in the present embodiment, the state of the engine 19 is determined based on the temperature of the coolant which is thought to show a temperature transition behavior that is similar to that of the engine 19.

As shown in FIG. 2, when the temperature of the coolant in the Eco-mode operation of the forklift truck 10 is at the temperature T1 or lower, the vehicle control unit 30 generates an instruction that is indicative of torque control based on the torque limit value R1 to release the state of the engine 19 in which the torque is controlled. The temperature T1 in the present embodiment corresponds to the release temperature of the present invention at which the engine output is hard to be stabilized. The release temperature is determined preliminarily based on simulation testing and the like and data for the temperature is stored in the vehicle control unit 30. When the accelerator pedal 33 is depressed, the vehicle control unit 30 generates to the engine control unit 31 an instruction that is indicative of an engine speed based on an opening of the accelerator pedal 33. In response to such instruction signal, the engine control unit 31 controls the engine 19 so that the engine 19 is operated at the engine speed which is based on the torque control instruction and the engine speed instruction. As a result, the engine 19, which is free from the torque control, produces a torque that is based on the engine speed according to the opening of the accelerator pedal 33. This state of the engine 19 is substantially the same as when the engine 19 is operating in the normal mode. Torque is not controlled while the engine output is hard to be stabilized even when the Eco-mode is activated. Therefore, insufficiency of the torque of the engine 19 does not occur when the accelerator pedal 33 is operated for loading operation.

The vehicle control unit 30 constantly receives signals indicative of the temperature detected by the temperature sensor 37 through the engine control unit 31. In the Eco-mode, when the temperature detected by the temperature sensor 37 has exceeded the temperature T1, the vehicle control unit 30 controls the torque by releasing the state of the engine 19 in which torque is not controlled.

In this case, the vehicle control unit 30 does not immediately control the torque based on the specified torque limit value R2(%), but changes the torque limit value gradually with the elapse of time, as indicated by slant line in the graph of FIG. 2 before a torque control instruction based on the specified torque limit value R2 is issued. In returning the torque limit value to the specified torque limit value R2, the vehicle control unit 30 of the present embodiment selects one of two controlling methods so that torque is controlled based on the specified torque limit value R2 in the Eco-mode.

The first control method is a temperature-dependent control according to which the torque limit value is changed gradually with an increase of the temperature until the temperature detected by the temperature sensor 37 reaches the temperature T2. The temperature T2 corresponds to the specified temperature at which a stabilized engine output is obtained. The temperature T2 is preliminarily determined based on simulation testing and stored in the vehicle control unit 30.

The second control method is a time-dependent control in which the torque limit value is changed gradually with the elapse of time. The duration of time in which the torque limit value is returned to the torque limit value R2 is determined preliminarily based on simulation testing and stored in the vehicle control unit 30.

As shown in FIG. 3, the vehicle control unit 30 compares a change rate ΔX of the torque limit value per unit time when the first control method is performed and a change rate ΔY of the torque limit value per unit time when the second control method is used, and selects one of the control methods whose change rate is smaller. More specifically, when the change rate ΔX is the change rate ΔY or smaller, the vehicle control unit 30 selects the first control method to change the torque limit value according to the increase of temperature and sets the torque limit value at which the temperature T2 is reached as the specified torque limit value R2. If the change rate ΔY is smaller than the change rate ΔX, on the other hand, the vehicle control unit 30 selects the second control method to change the torque limit value according to the elapse of time and sets the torque limit value at the time when the specified time has elapsed as the specified torque limit value R2. Thus changing the torque limit value gradually prevents a rapid change of the torque limit value.

Once the torque limit value has reached the specified torque limit value R2, the vehicle control unit 30 generates an instruction that is indicative of torque control for the specified torque limit value R2 to control the torque of the engine 19 while the Eco-mode remains activated.

When the temperature of the coolant is higher than the temperature T1 during the operation of the forklift truck 10 in the Eco-mode, the vehicle control unit 30 does not release the torque control on the engine 19 as described earlier, but generates the torque control instruction based on the specified torque limit value R2 to control the torque of the engine 19. Furthermore, in the normal mode, the vehicle control unit 30 generates the torque control instruction for the torque limit value R1 irrespective of the temperature of the coolant and does not control the torque.

The present embodiment offers the following effects.

(1) In the Eco-mode, control of the torque of the engine 19 can be released when the engine output is not stabilized. Accordingly, operating the hydraulically-operated devices (i.e. the tilt cylinders 15 and the lift cylinders 16) before the engine 19 is sufficiently warmed up, for example, just after a start-up of the engine 19 will not cause the engine 19 to suffer from insufficient torque, so that the engine 19 is prevented from stalling.

(2) When the temperature detected by the temperature sensor 37 is at the temperature T2 or higher, it is possible to control the torque in the Eco-mode in accordance with the specified torque limit value R2. Thus, the fuel efficiency is improved in the Eco-mode. It is to be noted that the temperature T2 is higher than the temperature T1.

(3) In the Eco-mode, when the temperature detected by the temperature sensor 37 is at the temperature T1 or lower, the time required for warming up the engine 19 may be reduced by not controlling the torque. The reduced warm-up time of the engine 19 contributes to enhancement of the fuel efficiency.

(4) When the temperature detected by the temperature sensor 37 has exceeded the temperature T1, the vehicle control unit 30 changes the torque limit value gradually. Therefore, a rapid change of the engine speed due to a rapid change of the torque limit value is prevented and stabilized control of the forklift truck 10 is accomplished.

(5) Additionally, selecting either the temperature-dependent control (the first control method) or the time-dependent control (the second control method) surely suppresses a rapid change of the torque limit value with certainty.

(6) Determination as to whether or not to control the torque based on the temperature of the coolant of the engine 19 permits the use of the existing configuration (the temperature sensor 37) for controlling the engine 19, with the result that the fuel efficiency is improved and the occurrence of an engine stall is prevented without involving an increase in the cost.

It is to be noted that the above-described embodiment may be modified in various ways as follows.

In controlling the torque of the engine 19, when the temperature detected by the temperature sensor 37 is higher than the temperature T1 in the Eco-mode, the torque control instruction may be returned to the torque control instruction based on the specified torque limit value R2 by selecting only the first control method (or the temperature-dependent control). According to this control, a rapid change of the engine speed due to a rapid change of the specified torque limit value is prevented and stabilized control of the forklift truck 10 is accomplished.

In controlling the torque of the engine 19, when the temperature detected by the temperature sensor 37 is higher than the temperature T1 in the Eco-mode, the torque control instruction may be returned to the torque control instruction based on the specified torque limit value R2 by selecting the second control method (or the time-dependent control). According to this control, a rapid change of the engine speed due to a rapid change of the specified torque limit value is prevented and stabilized control of the forklift truck 10 is accomplished.

In controlling the torque of the engine 19, when the temperature detected by the temperature sensor 37 is higher than the temperature T1 in the Eco-mode, the torque control instruction may be returned to the torque control instruction based on the specified torque limit value R2 at a time when the detected temperature has exceeded the temperature T1.

In the Eco-mode, determination as to whether or not to release the torque control may be made based on the temperature of the hydraulic oil of the hydraulically-operated device. Furthermore, in the case that the power transmission mechanism 22 includes a torque converter, determination as to whether or not to release the torque control may be made based on the temperature of the hydraulic oil of the torque converter. Still furthermore, the temperature of the lubricating oil of the engine 19 (or engine oil) may be detected as the temperature of the engine 19 instead of the coolant temperature. In this case, the determination as to whether or not to release the torque control may be made based on the lubricating oil temperature. It is noted that the temperature of the engine 19 and the temperature of the hydraulic oil of the torque converter represent the temperature of the drive system of the forklift truck 10 of the present embodiment, while the temperature of the hydraulic oil of the hydraulically-operated device represents the temperature of the loading system of the forklift truck 10.

In the present embodiment, it is so configured that the Eco-mode switch 35 is provided at a position adjacent to the driver's seat in the forklift truck 10 so that the operator of the forklift truck 10 can change the setting of the position of the Eco-mode switch 35 as desired. However, the configuration may be such that the setting of the Eco-mode switch 35 of the forklift truck 10 can be changed by an administrator (or the manufacturer) of the forklift truck 10 as appropriate according to the specifications of the forklift truck 10. In other words, setting of the Eco-mode may be made by an authorized person. In this case, the Eco-mode can be deactivated under a specific condition (e.g. the temperature of the coolant of the engine) in a manner as performed in the above-described present embodiment.

The torque limit value R1 in the normal mode may be greater than the specified torque limit value R2 in the Eco-mode. Therefore, the torque limit value R1 may be a value that controls the engine output to be 100% or a value that controls the engine output to be less than 100%.

The forklift truck 10 according to the present embodiment may further include a hydraulic cylinder as a hydraulically-operated device that operates an implement of the forklift truck 10.

The forklift truck 10 according to the present embodiment may further include a hydraulic cylinder as the hydraulically-operated device that operates a power steering mechanism of the forklift truck 10.

The hydraulic mechanism 21 may use an electromagnetic valve for the control valve and the vehicle control unit 30 may be configured to control the operation of the electromagnetic valve.

The power transmission mechanism 22 may be of a manual transmission or of an automatic transmission using a torque converter.

The vehicle equipped with a hydraulically-operated device according to the present invention is not limited to the forklift truck 10 and it may be embodied as a shovel loading machine and the like.

What is claimed is:

1. A vehicle equipped with a hydraulically-operated device comprising:
    an engine that drives the hydraulically-operated device;
    a temperature detection unit that detects a temperature of the engine or hydraulic oil; and
    a control unit that controls the engine, wherein
    the control unit is allowed to control torque of the engine in accordance with a predetermined specified torque limit value when the control unit is in an Eco-mode,
    the control unit controls the engine without controlling the torque of the engine in accordance with the specified torque limit value in the Eco-mode when the temperature detected by the temperature detection unit is at a predetermined release temperature or lower, and
    the release temperature is set as a temperature at which output of the engine is hard to be stabilized when the torque of the engine is controlled.

2. The vehicle equipped with the hydraulically-operated device according to claim 1, wherein
    when the detected temperature is at a predetermined specified temperature or higher, the control unit controls the torque of the engine in accordance with the specified torque limit value in the Eco-mode, and
    the specified temperature is higher than the release temperature.

3. The vehicle equipped with the hydraulically-operated device according to claim 2, wherein
    when the detected temperature has exceeded the release temperature, the control unit changes a torque limit value gradually with an increase of the detected temperature until the detected temperature reaches the specified temperature.

4. The vehicle equipped with the hydraulically-operated device according to claim 2, wherein
    when the detected temperature has exceeded the release temperature, the control unit performs both a temperature-dependent control in which the torque limit value is changed gradually with an increase of the detected temperature until the detected temperature reaches the specified temperature, and a time-dependent control in which the torque limit value is changed gradually with the elapse of time, and compares a change rate of the torque limit value per unit time when the temperature-dependent control is performed and a change rate of the torque limit value per unit time when the time-dependent control is performed to perform one of the controls whose change rate is smaller.

5. The vehicle equipped with the hydraulically-operated device according to claim 1, wherein when the detected temperature has exceeded the release temperature, the control unit changes the torque limit value gradually with elapse of time.

* * * * *